(12) United States Patent
Wang et al.

(10) Patent No.: US 9,138,726 B2
(45) Date of Patent: Sep. 22, 2015

(54) COPPER-BASED CATALYST FOR CONVERTING AMMONIA INTO NITROGEN

(71) Applicant: I-SHOU UNIVERSITY, Kaohsiung (TW)

(72) Inventors: Shih-Han Wang, Kaohsiung (TW); Ming-Tsai Liang, Kaohsiung (TW); Yuh-Wern Wu, Kaohsiung (TW)

(73) Assignee: I-SHOU UNIVERSITY, Kaohsiung (TW)

( * ) Notice: Subject to any disclaimer, the term of this patent is extended or adjusted under 35 U.S.C. 154(b) by 0 days.

(21) Appl. No.: 13/961,470

(22) Filed: Aug. 7, 2013

(65) Prior Publication Data

US 2014/0287911 A1    Sep. 25, 2014

(30) Foreign Application Priority Data

Mar. 19, 2013 (TW) .............................. 102109694 A

(51) Int. Cl.
*B01J 23/72* (2006.01)
*C01B 21/02* (2006.01)

(52) U.S. Cl.
CPC . *B01J 23/72* (2013.01); *C01B 21/02* (2013.01)

(58) Field of Classification Search
CPC .......................................................... B01J 23/72
USPC .......................................................... 502/345
See application file for complete search history.

(56) References Cited

U.S. PATENT DOCUMENTS

| 7,527,776 B2 * | 5/2009 | Golden et al. ............. 423/239.1 |
| 2002/0040161 A1 * | 4/2002 | Ryan et al. .................... 564/127 |
| 2011/0176988 A1 | 7/2011 | Okamura et al. |

FOREIGN PATENT DOCUMENTS

TW    I259782    8/2006

* cited by examiner

*Primary Examiner* — Matthew E Hoban
*Assistant Examiner* — James Fiorito
(74) *Attorney, Agent, or Firm* — Muncy, Geissler, Olds & Lowe, P.C.

(57) ABSTRACT

A copper-based catalyst which is suitable for converting ammonia of high concentration and with better selectivity, thereby solving a problem of pollution and toxicity due to nitrogen oxides by a conventional catalyst reacting under high temperature is disclosed. The copper-based catalyst comprises: a porous oxide support and a low valent copper compound mixing with the porous oxide support by an acid hydrothermal method; wherein the low valent copper compound with is Cu and $Cu_2O$.

2 Claims, 10 Drawing Sheets

COPPER-BASED CATALYST FOR CONVERTING AMMONIA INTO NITROGEN

BACKGROUND OF THE INVENTION

1. Field of the Invention

The present invention generally relates to a copper-based catalyst for converting ammonia ($NH_3$) into nitrogen and, more particularly, to a copper-based catalyst with better selectivity and suitable for converting ammonia ($NH_3$) of high concentration.

2. Description of the Related Art

Waste resin generated by industries can be wet treated to produce ammonia with concentration up to 66.7%. Ammonia can be decomposed by a catalytic decomposition method. There are two kinds of catalytic decomposition methods for ammonia, which are reduction reaction and oxidation reaction. The reduction decomposition method mainly produces hydrogen and nitrogen, but is energy-waste due to its high reaction temperature. The oxidation decomposition method mainly produces nitrogen and water. Nitrogen produced by the oxidation decomposition method may react with oxygen, convert into nitride oxides as nitric oxide, nitrogen dioxide, or nitrous oxide, thereby becoming a pollution source of the natural environment.

To solve the problems resulting from the catalytic decomposition of ammonia, industries make an utmost effort to develop various catalysts. For instance, a conventional platinum/copper oxide/aluminum oxide ($Pt/CuO/Al_2O_3$) catalyst with selectivity is used in a decomposition process of ammonia, by which produces vapor mainly containing nitrogen and water. However, as long as the reaction temperature of the process increases, nitrogen produced in the process tends to react with oxygen, thereby converting into nitride oxides as nitric oxide, nitrogen dioxide, or nitrous oxide. In addition to nitride oxides as the pollution sources produced in the process, the conventional platinum/copper oxide/aluminum oxide, catalyst is also a catalyst with higher cost. Therefore, it is necessary to further improve the conventional platinum/copper oxide/aluminum oxide catalyst.

In Taiwan patent No.I259782, an activated fiber, a furnace stone or a furnace stone powder is used as a porous support. The porous support has a copper or a cuprate as a catalytic center, and is converted into a conventional catalyst by ion exchange and calcination. Although the conventional catalyst has decomposition conversion of ammonia up to 90%, only 85% of nitrogen produced by the conventional catalyst can be exhausted as nitrogen form. As a result, the remained nitrogen will convert into nitride oxides, thereby becoming pollution sources and generating awful effect to natural environment.

Moreover, noble metal as platinum, palladium, ruthenium, iridium or silver is used as a conventional catalyst. The easily oxidized noble metal converts ammonia into nitrogen under lower temperature. However, the conventional catalyst with noble metal has a higher cost, thereby decreasing the economic benefit of processing the waste.

In light of this, it is necessary to develop a copper-based catalyst differing from the conventional catalysts and suitable for selectively decomposing ammonia into nitrogen to solve the problems discussed above.

SUMMARY OF THE INVENTION

It is therefore the objective of this invention to provide a cooper-based catalyst with lower activation energy, converting high concentration ammonia into nitrogen under lower temperature.

It is another objective of this invention to provide a cooper-based catalyst, decreasing the production of nitride oxides during the catalyzing process, improving decomposition efficiency and selectivity of ammonia, and reducing pollution of the natural environment.

One embodiment of the invention discloses a copper-based catalyst for converting ammonia into nitrogen comprising a porous oxide support and a copper compound with low valent. The copper compound with low valent decorated on the porous oxide support by utilizing hydrothermal technique in acid condition. The copper compound with low valent is Cu and $Cu_2O$.

In a preferred form shown, the porous oxide support adheres to 20~40 wt % of the copper compound with low valent.

In a preferred form shown, the porous oxide support is aluminum oxide, silicon oxide, clay or zeolitest.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

An embodiment of a copper-based catalyst for converting ammonia into nitrogen according to preferred teachings of the present invention include porous oxide support and copper compound with low valent. The copper compound with low valent mixes with the porous oxide support by an acid hydrothermal method. The copper compound with low valence is Cu and $Cu_2O$.

Generally, in the acid hydrothermal method, water is used as a solvent under a high temperature and high pressure environment where the pH value of the environment is smaller than 7.

In detail, the copper compound with low valence has a valence smaller than 2. The copper compound with low valence, such as copper or cuprous oxide, has lower activation energy. Therefore, the copper-based catalyst including the copper compound with low valence and the porous oxide support can be used in a catalysis process, as shown in formula 1, to convert ammonia into nitrogen under lower temperature (especially at 150~300° C.).

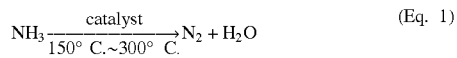

$$NH_3 \xrightarrow[150° C.~300° C.]{catalyst} N_2 + H_2O \quad \text{(Eq. 1)}$$

By undergoing the catalysis process shown in Eq. 1, nitrogen will not convert into nitride oxides (nitric oxide, nitrogen dioxide or nitrous oxide and so on, which the general formula is $NO_x$) triggered by high temperature.

For instance, in this embodiment of the invention, the porous oxide support is chose from aluminum oxide, silicon oxide, clay or zeolitest, while the better choice is aluminum oxide. Aluminum oxide reacts with Cu and $Cu_2O$, followed by converting into derivatives of copper aluminum oxide ($CuAl_xO_y$). By copper aluminum oxide, the copper-based catalyst containing aluminum oxide has better catalyst activity. Moreover, the porous oxide support with a preferable size of 30 nm~0.42 mm has better synthesis efficiency of the catalyst. Specifically, since the porous oxide support adhere to 20~40 wt % of copper compounds with low valence, the reaction accomplished with copper-based catalyst has lower activation energy, especially react with the metallic copper. In a consequence, the copper-based catalyst can convert ammonia into nitrogen under lower temperature.

Figure 1A:
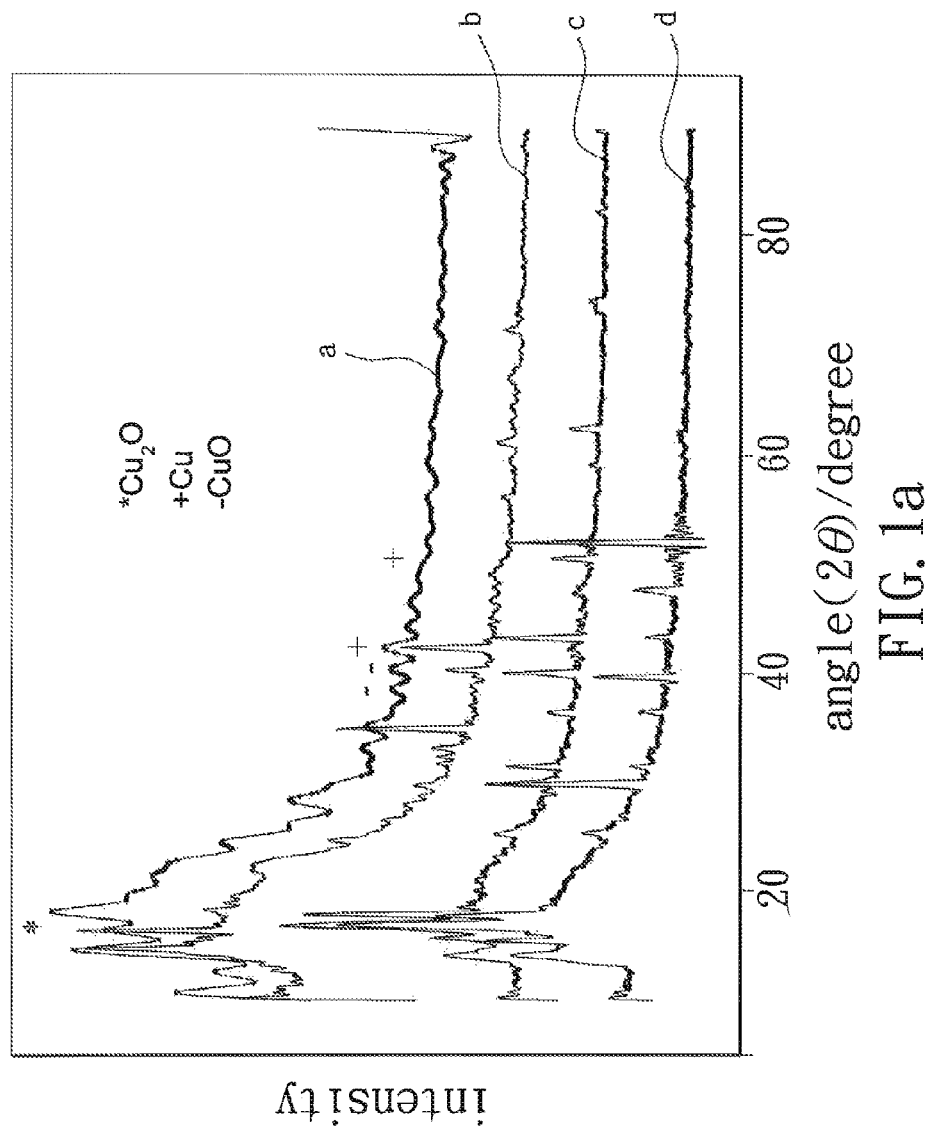
FIG. 1a~1c are charts of X-ray diffraction analyses.
Figure 1B:
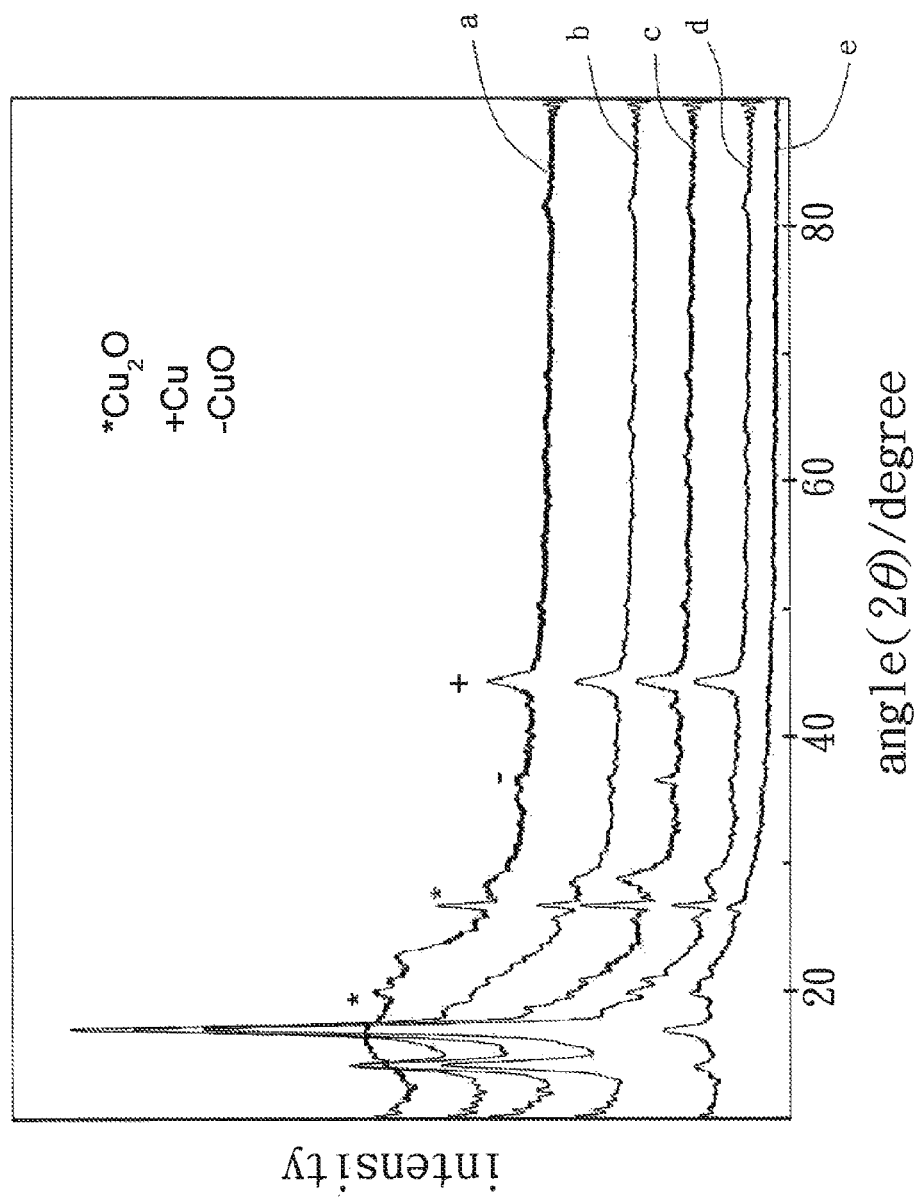
Figure 1C:
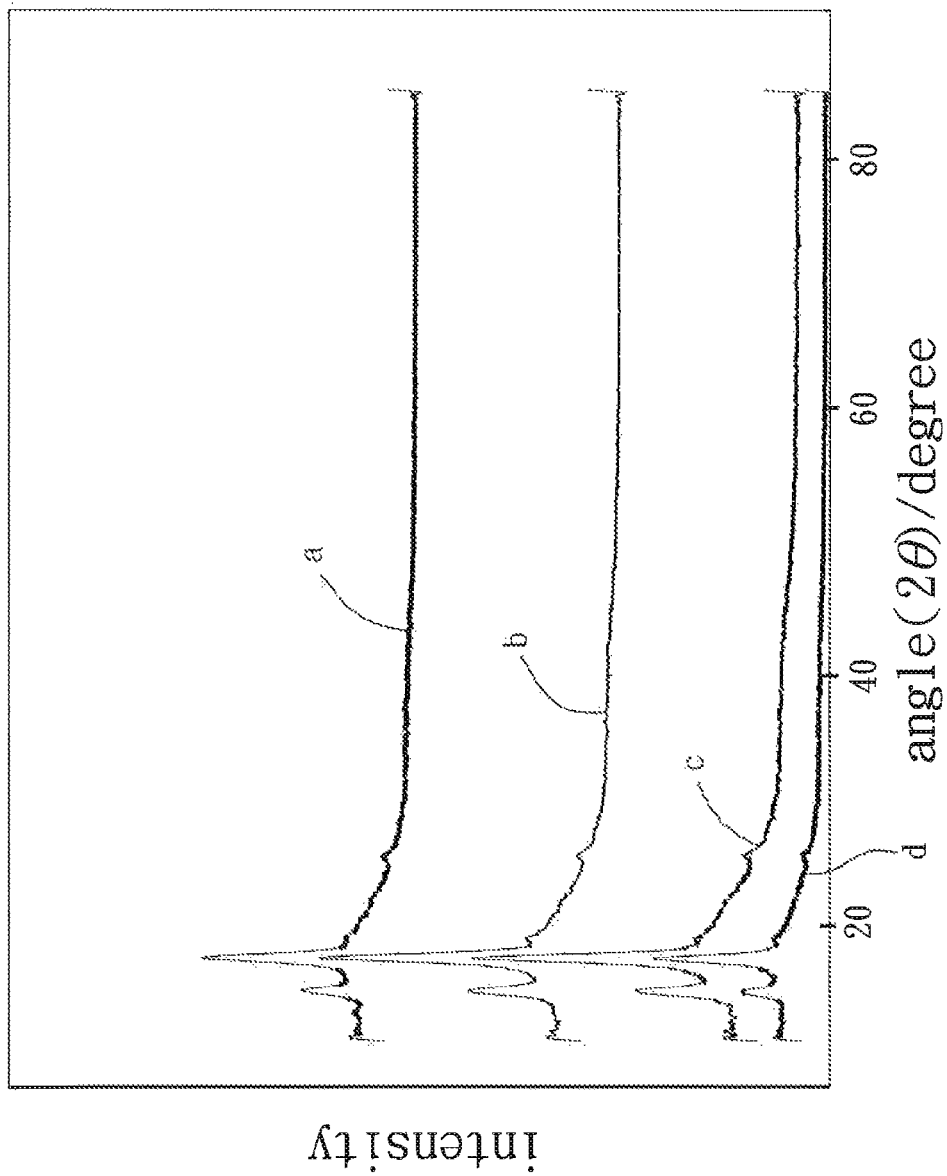

In order to prove the copper-based catalyst of the invention has better efficiency in converting ammonia into nitrogen, several operating conditions are tested. The porous oxide supports as aluminum oxide ($\gamma$-$Al_2O_3$), clay and zeolite mix with metallic copper, respectively, to synthesize the copper-based catalysts. Testing results of conversion (the ability of the copper-based catalyst to convert ammonia into nitrogen) and selectivity (the efficiency of the copper-based catalyst not to convert ammonia into nitride oxides through nitrogen) are shown below:

FIGS. 1a~1c shows results of the X-ray diffraction (XRD) analyses of the copper-based catalysts comprising $\gamma$-$Al_2O_3$ (FIG. 1a), clay (FIG. 1b) and zeolite (FIG. 1c), respectively. The copper-based catalysts are synthesized by a supercritical hydrothermal method (curve "a"), a subcritical hydrothermal method (curve "b"), a supercritical alcohothermal method (curve "c") and a subcritical alcohothermal method (curve "d"), respectively. As shown in FIGS. 1a~1c, whether the porous oxide supports are chose from $\gamma$-$Al_2O_3$, clay or zeolite, the copper-based catalysts have crystalline phases of $Cu^0$. Moreover, as proved by inductively coupled plasma optical emission spectrometry (ICP-OES) analysis, whether the is porous oxide supports are chose from $\gamma$-$Al_2O_3$, clay or zeolite, the copper-based catalysts synthesized by the supercritical hydrothermal method have a better copper content up to 39.61 wt %.

Figure 2A:
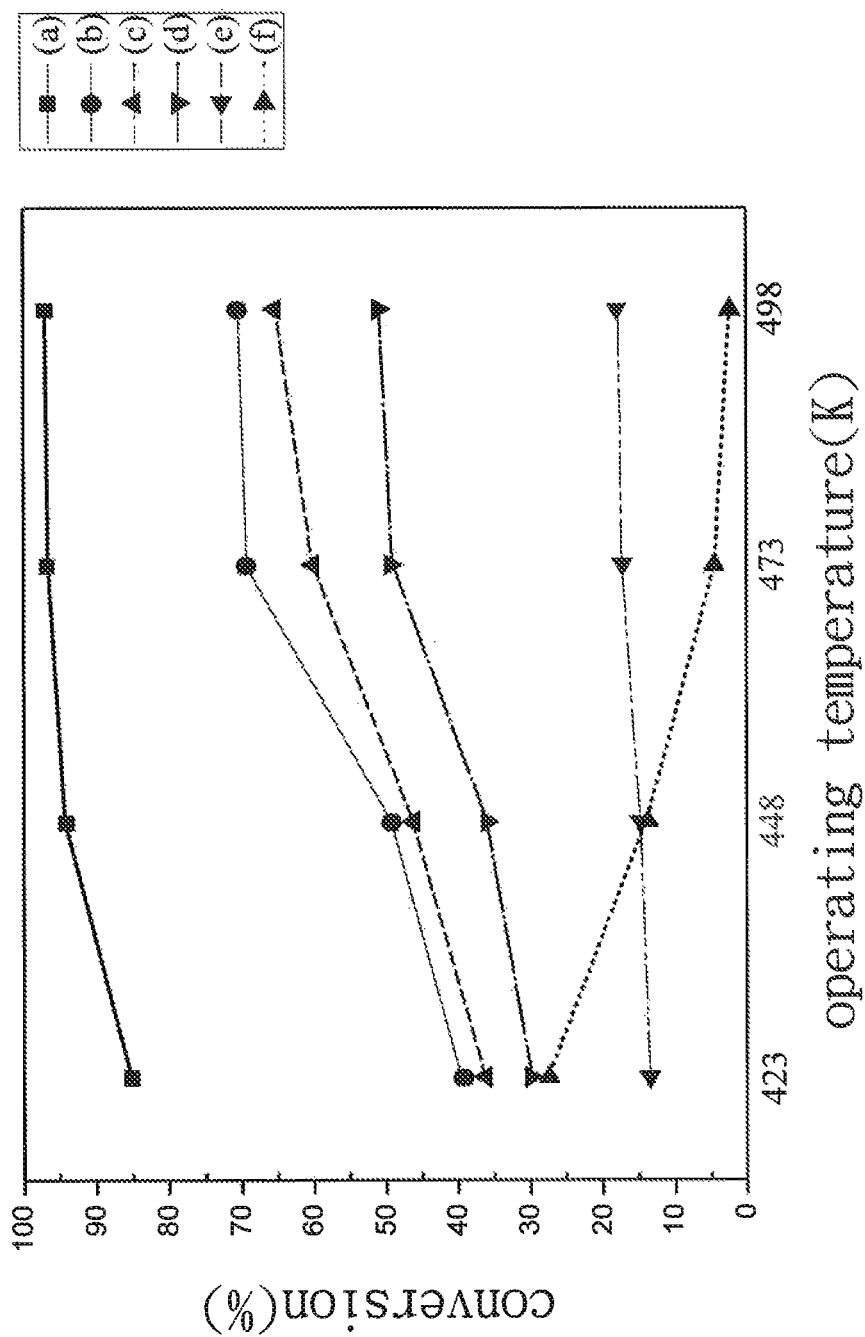
FIG. 2a~2c are charts of conversion of ammonia into nitrogen by the copper-based catalysts with different supports.
Figure 2B:
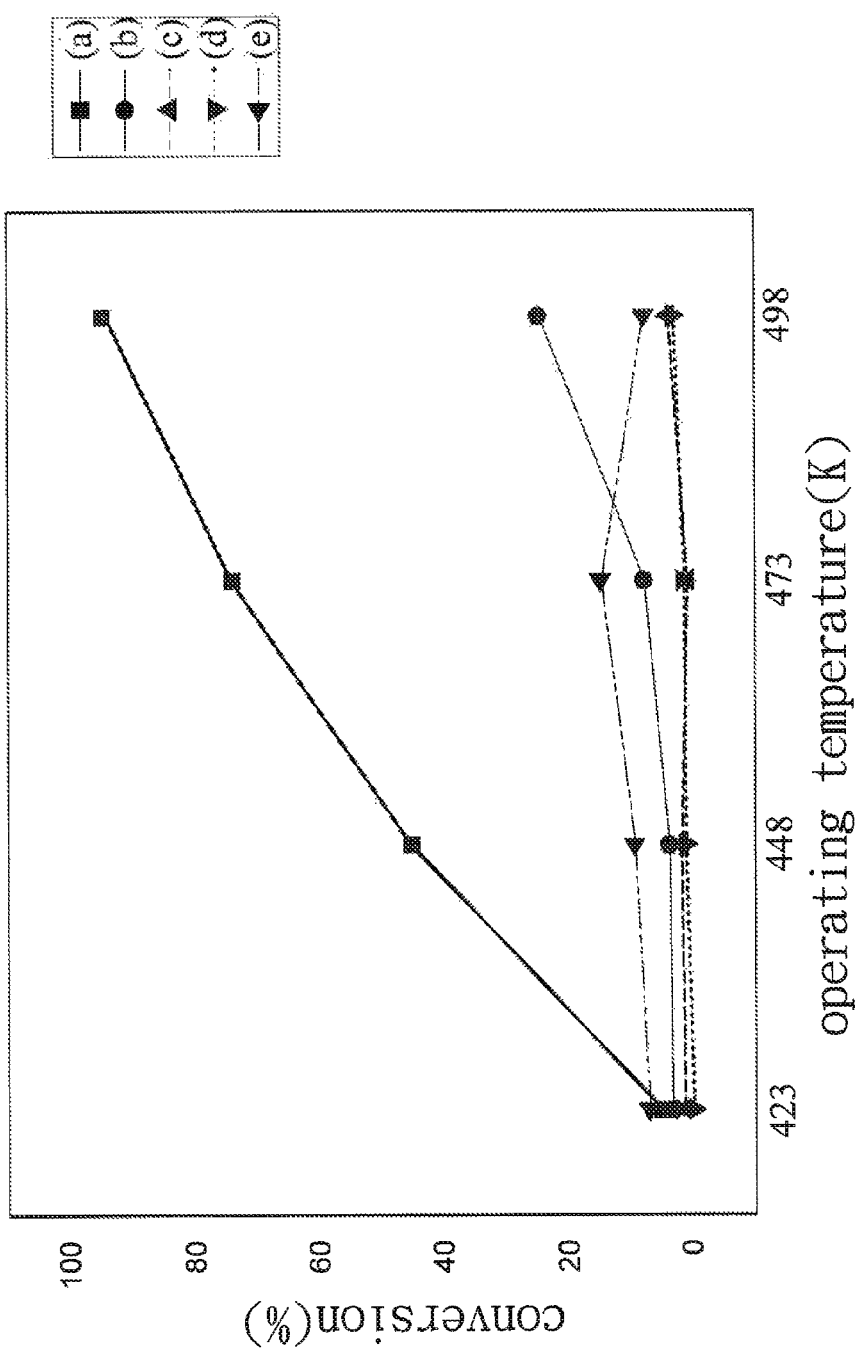
Figure 2C:
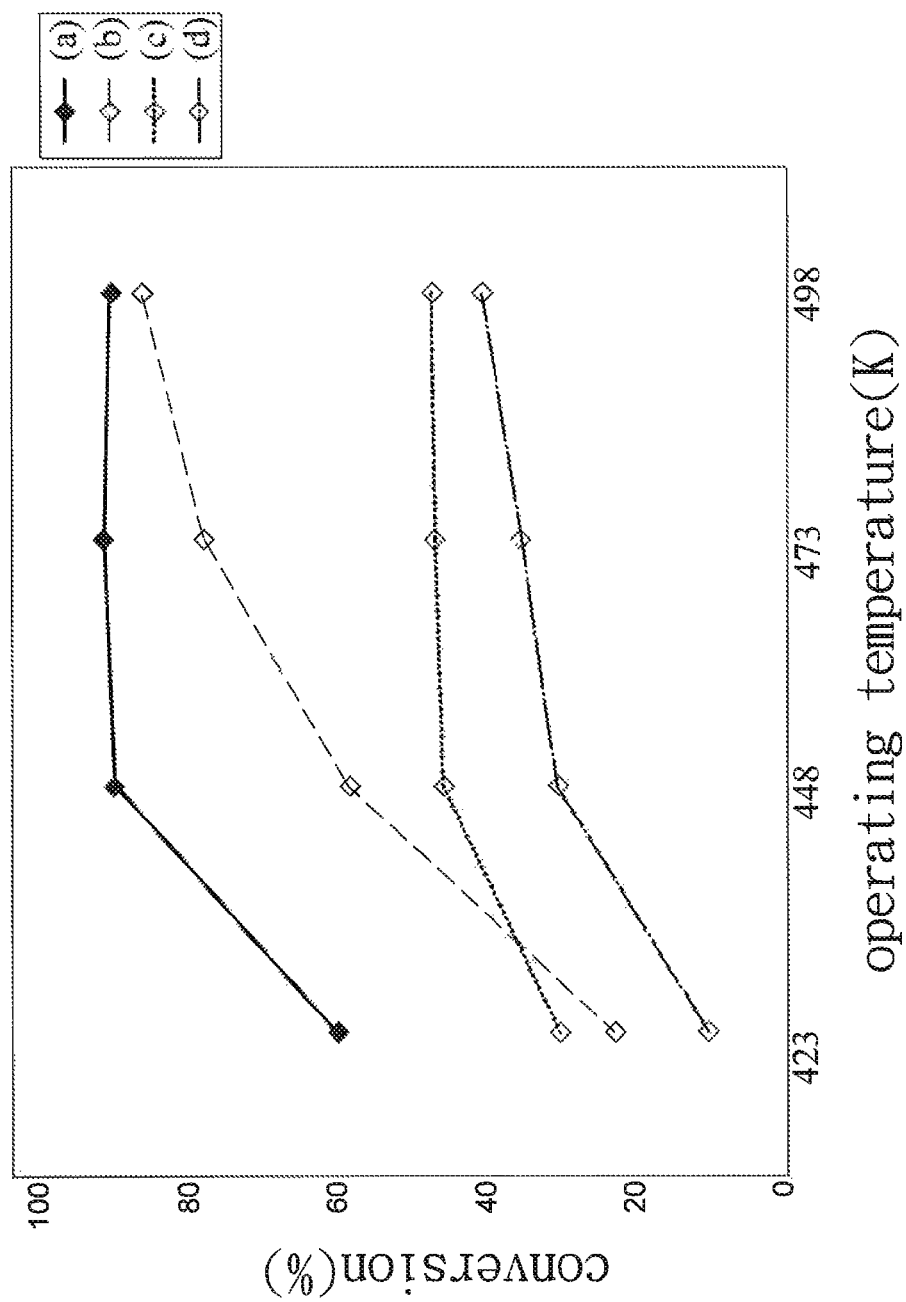

FIGS. 2a~2c show the conversion of ammonia into nitrogen by the copper-based catalysts, wherein the porous oxide supports are chose from $\gamma$-$Al_2O_3$ (FIG. 2a), clay (FIG. 2b) or zeolite (FIG. 2c), respectively. The copper-based catalysts are synthesized by the supercritical hydrothermal method (curve "a", pressure of 250 bar, temperature of 400° C.), the subcritical hydrothermal method (curve "b", pressure of 250 bar, temperature of 350° C.), the supercritical alcohothermal method (curve "c", pressure of 100 bar, temperature of 300° C.) and the subcritical alcohothermal method (curve "d", pressure of 100 bar, temperature of 250° C.) or a microwave method (curve "e", temperature of 100° C.), respectively. Curve "f" is a control of the supports without reacting. As a result, the cooper-based catalysts synthesized by the supercritical hydrothermal method have better catalyst activity, which the conversion of ammonia into nitrogen by the copper-based catalysts at 423K~498K (approximately 127~225° C.) is nearly 90%. Moreover, when a flux ratio of oxygen/ammonia is 5, a flow rate is 0.6 ml/s, and carbon dioxide gas shows a steady pressure, the copper-based catalysts show higher conversion of ammonia into nitrogen. That is, the copper-based catalysts with a particle size of the porous oxide supports being 0.21~0.42 mm and a content of the low valent copper compounds being 20~40 wt %, show better catalyst activity under the condition mentioned above.

Figure 3:
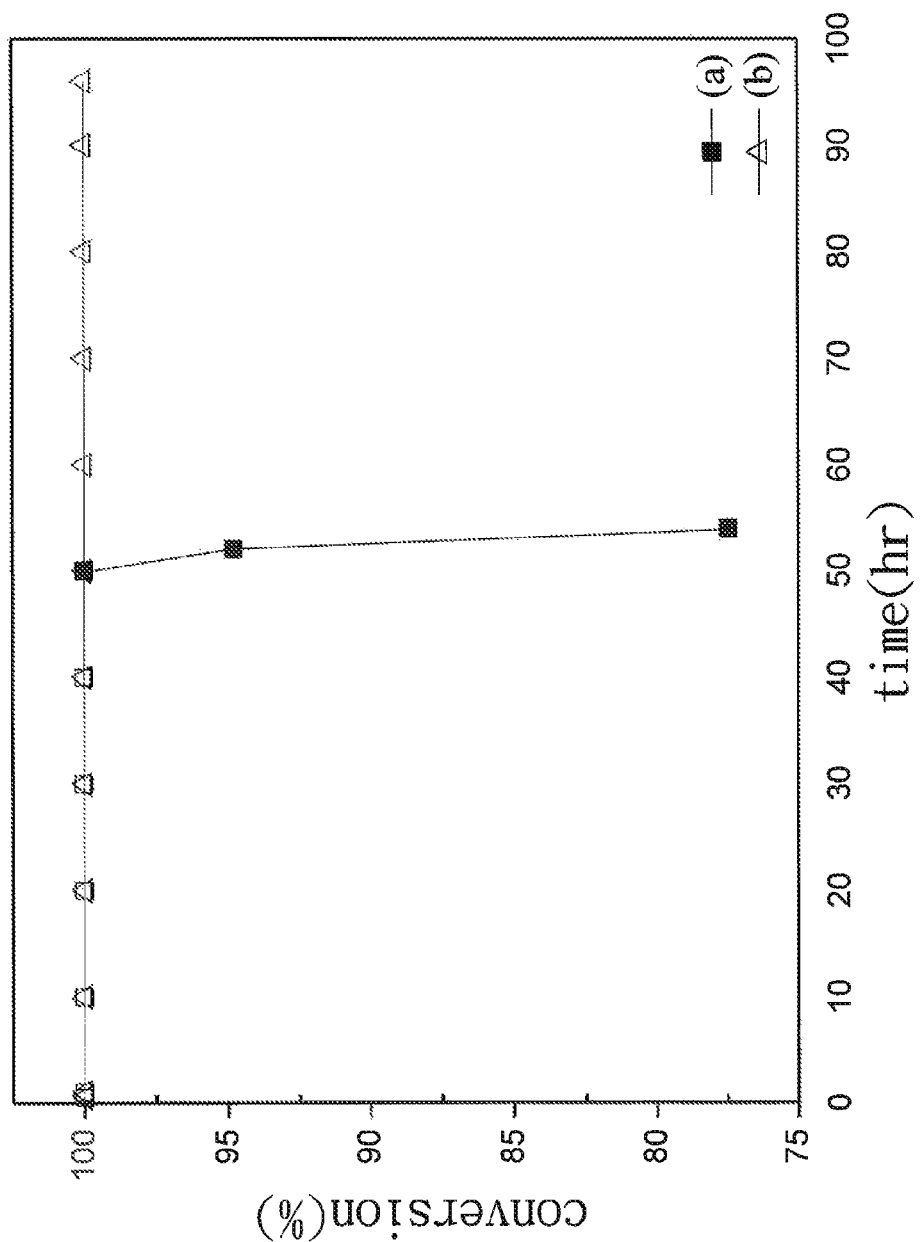
FIG. 3 is a chart of conversion of ammonia decomposed into nitrogen by the copper-based catalysts under different temperature for a long period.

The conversion of ammonia decomposed into nitrogen by the copper-based catalysts with porous oxide supports as $\gamma$-$Al_2O_3$ synthesized by the supercritical hydrothermal method under different temperatures for a long period are shown in FIG. 3, while a concentration of $NH_3$ is 66.7% and a flux ratio of $O_2/NH_3$ is 5. Curve "a" shows a result under 150° C. while curve "b" shows a result under 175° C. As a result, the conversion of ammonia decomposed into nitrogen with copper-based catalysts remain nearly 100% under a low-temperature environment of 175° C., indicating that the copper-based catalysts have superior catalyst activity.

Figure 4A:
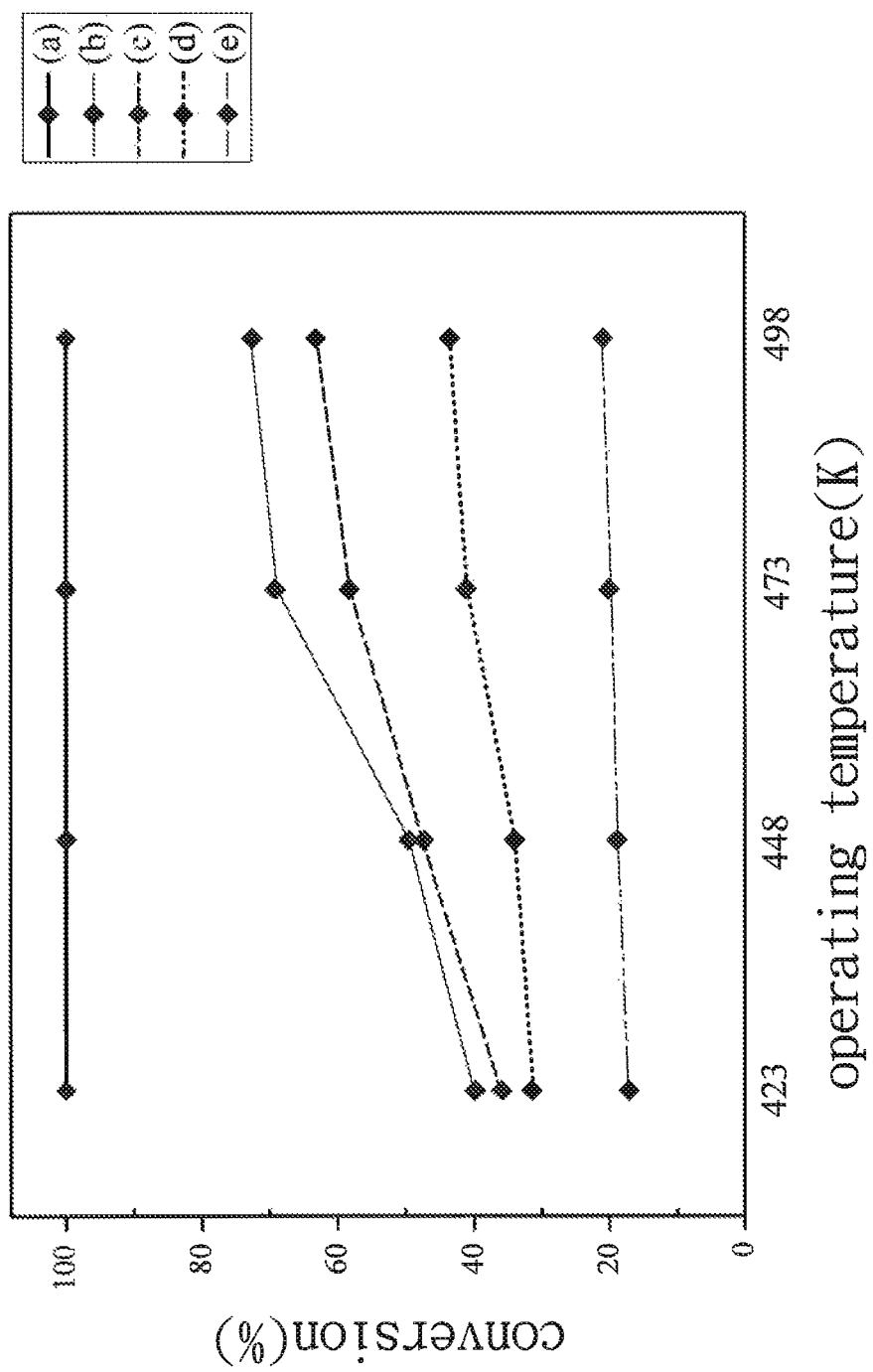
FIG. 4a~4b are charts of selectivity analyses of the copper-based catalysts.
Figure 4B:
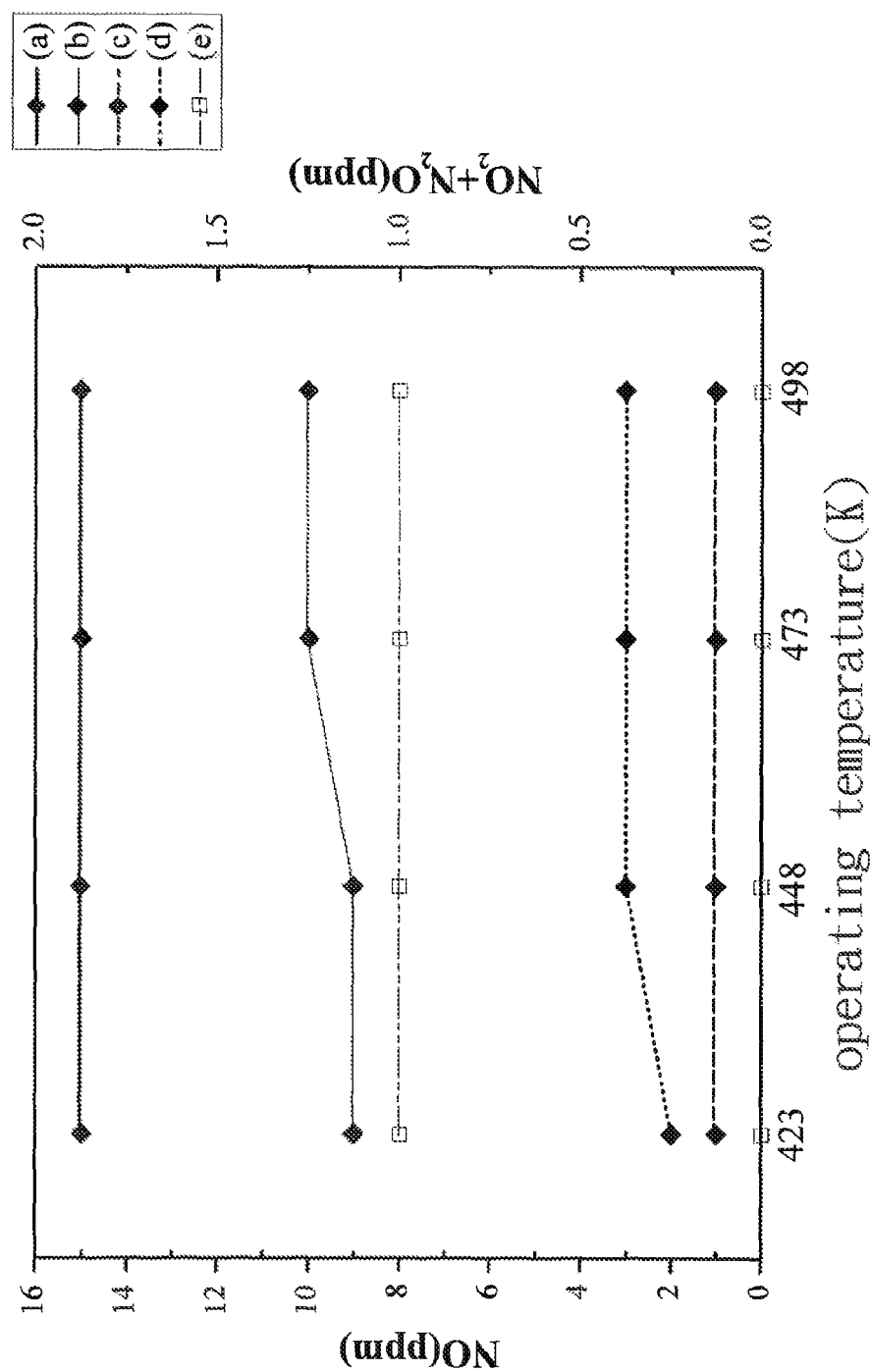

Besides, the conversion of ammonia into nitrogen by the copper-based catalysts of the invention and contents of nitride oxides (nitric oxide, nitrogen dioxide or nitrous oxide etc.) reacted with the copper-based catalysts of the invention are measured under different operating conditions. In FIG. 4a, a flux ratio of $O_2/NH_3$ is 5. The copper-based catalysts are synthesized by the supercritical hydrothermal method (curve "a"), the subcritical hydrothermal method (curve "b"), the supercritical alcohothermal method (curve "c"), the subcritical alcohothermal method (curve "d") and a chemical reduction method (curve "e"), respectively. Furthermore, FIG. 4b shows contents of NO and $NO_2+N_2O$ (♦: NO; □: $NO_2+N_2O$) produced from the reaction with copper-based catalysts of the invention, wherein the copper-based catalysts are synthesized by the supercritical hydrothermal method (curve "a"), the subcritical hydrothermal method (curve "b"), the supercritical alcohothermal method (curve "c"), the subcritical alcohothermal method (curve "d") and the chemical reducing method (curve "e"), respectively. As a result, the copper-based catalyst of the invention ($\gamma$-$Al_2O_3$ is chose as the porous oxide support, and the copper-based catalyst is synthesized by the supercritical hydrothermal method) with higher conversion (as shown in FIG. 4a) has better selectivity. Therefore, the nitrogen produced from the ammonia decomposition with copper-based catalyst of the invention will not convert into nitride oxides for the further pollution (as shown in FIG. 4b).

Figure 5:
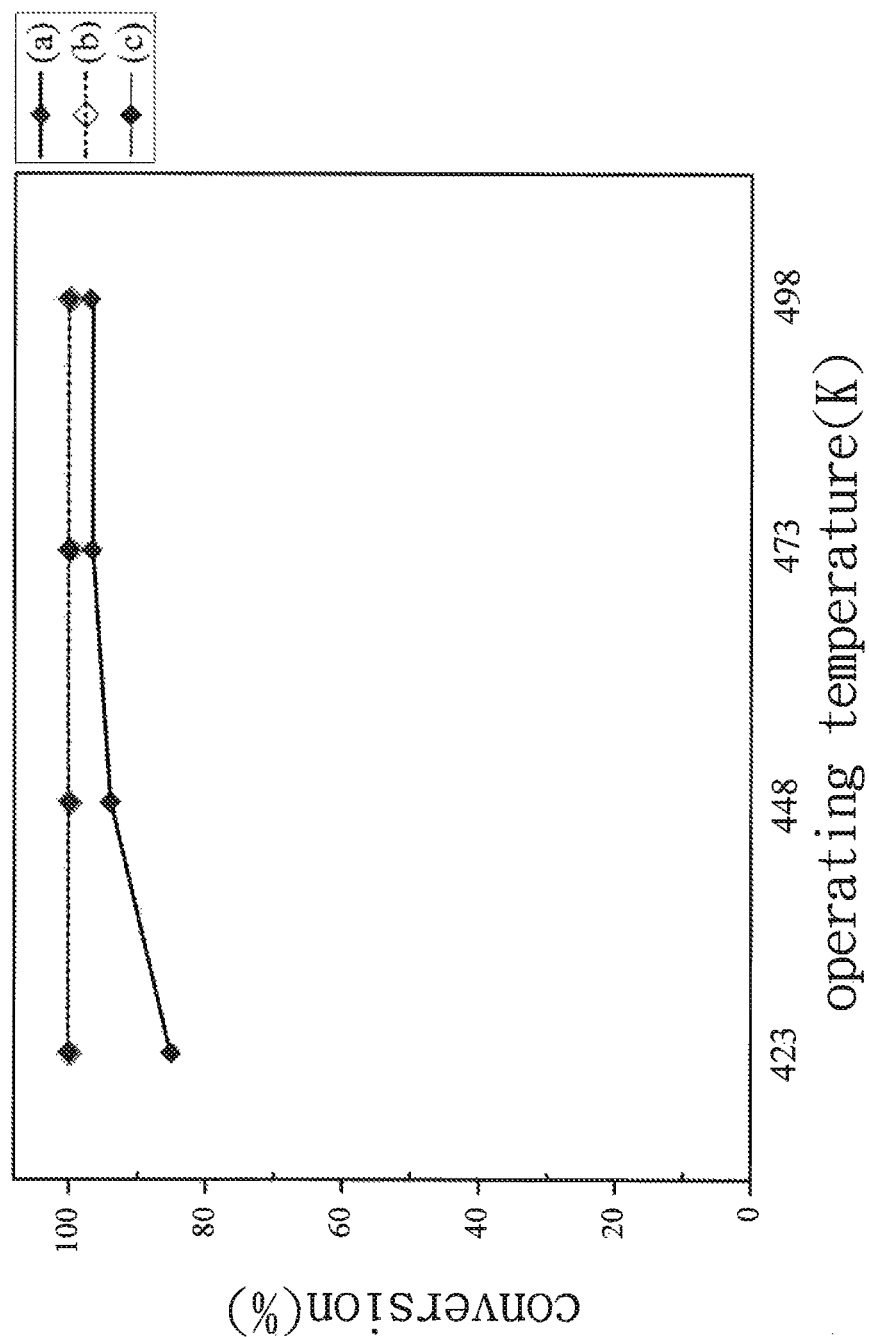
FIG. 5 is a chart of conversion of ammonia decomposed into nitrogen by the copper-based catalysts under different concentration of ammonia.

Moreover, the copper-based catalyst of the invention can be used to decompose no matter low or high concentration ammonia. As shown in FIG. 5, a flux ratio of $O_2/NH_3$ is 5. Concentration of ammonia of curve "a"~"c" is 100%, 66.7% and 76.7 ppm, respectively. As a result, although concentration of ammonia increases, the conversions of ammonia under different temperatures remain nearly 90%. Therefore, the copper-based catalyst of the invention can used to decompose ammonia which concentration is between 75 ppm and 99%.

In summary, according to the copper compound with low valence decorated on the porous oxide support by the acid hydrothermal method, the synthesized copper-based catalyst has lower activation energy of $Cu^+/Cu^0$. The copper-based catalyst converts high concentration of ammonia into nitrogen under low temperature where only nitrogen and water are produced during the catalytic process, avoiding converting nitrogen into nitride oxide triggered by the high temperature. The copper-based catalyst of the invention not only converts high concentration of ammonia into nitrogen under low temperature because of the lower activation energy, but also decreases the production of nitride oxide during the catalytic process. Therefore, the copper-based catalyst of the invention has improved decomposition efficiency of ammonia and decreases the pollution at the same time.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A copper-based catalyst for converting ammonia into nitrogen comprising:
   a porous oxide support;
   a low valent copper compound; and
   derivatives of copper aluminum oxide,
   wherein the porous oxide support adheres to the low valent copper compounds with a weight percentage of 39.61%, and
   wherein the low valent copper compound is Cu and $Cu_2O$, wherein the derivatives of copper aluminum are according to the formula $CuAl_xO_y$.

2. The copper-based catalyst for converting ammonia into nitrogen as defined in claim 1, wherein the porous oxide support is aluminum oxide clays or zeolites.

\* \* \* \* \*